(12) United States Patent
Zhu et al.

(10) Patent No.: US 9,942,932 B2
(45) Date of Patent: Apr. 10, 2018

(54) TERMINAL-TO-TERMINAL COMMUNICATION

(71) Applicant: FUJITSU LIMITED, Kawasaki-shi, Kanagawa (JP)

(72) Inventors: Chenxi Zhu, Fairfax, VA (US); Akira Ito, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/909,077

(22) PCT Filed: Jan. 7, 2014

(86) PCT No.: PCT/US2014/010517
§ 371 (c)(1),
(2) Date: Jan. 29, 2016

(87) PCT Pub. No.: WO2015/016961
PCT Pub. Date: Feb. 5, 2015

(65) Prior Publication Data
US 2016/0198505 A1 Jul. 7, 2016

Related U.S. Application Data

(60) Provisional application No. 61/861,402, filed on Aug. 1, 2013.

(51) Int. Cl.
*H04W 4/00* (2009.01)
*H04W 76/02* (2009.01)
(Continued)

(52) U.S. Cl.
CPC ........ *H04W 76/023* (2013.01); *H04B 7/0456* (2013.01); *H04B 7/0617* (2013.01);
(Continued)

(58) Field of Classification Search
CPC . H04W 76/02; H04W 72/0406; H04W 72/04; H04L 5/001
(Continued)

(56) References Cited

U.S. PATENT DOCUMENTS 5,850,592 A    12/1998  Ramanathan
6,493,759 B1   12/2002  Passman et al.
(Continued)

FOREIGN PATENT DOCUMENTS

WO    2012/150815 A2    11/2012

OTHER PUBLICATIONS

U.S. Office Action issued in corresponding U.S. Appl. No. 14/909,082, dated Apr. 28, 2017.
(Continued)

*Primary Examiner* — Chi H Pham
*Assistant Examiner* — Alexander O Boakye
(74) *Attorney, Agent, or Firm* — Maschoff Brennan (57) ABSTRACT

A method of performing a terminal-to-terminal communication includes performing a terminal-to-terminal transmission via a portion of a radio spectrum licensed for transmission of wireless data. The terminal-to-terminal transmission is transmitted without performing terminal-to-terminal discovery associated with the terminal-to-terminal transmission. The terminal-to-terminal transmission is configured to be received by a terminal without being routed through a base station. The method further includes checking for an acknowledgement sequence and checking for a negative acknowledgement sequence.

18 Claims, 3 Drawing Sheets

(51) Int. Cl.

| | | |
|---|---|---|
| *H04W 8/00* | (2009.01) | |
| *H04B 7/0456* | (2017.01) | |
| *H04B 7/06* | (2006.01) | |
| *H04W 24/02* | (2009.01) | |
| *H04W 74/00* | (2009.01) | |
| *H04W 28/04* | (2009.01) | |
| *H04W 52/24* | (2009.01) | |
| *H04W 72/04* | (2009.01) | |
| *H04W 8/18* | (2009.01) | |
| *H04W 56/00* | (2009.01) | |
| *H04W 72/10* | (2009.01) | |

(52) U.S. Cl.
CPC .......... *H04B 7/0639* (2013.01); *H04W 4/005* (2013.01); *H04W 8/005* (2013.01); *H04W 8/186* (2013.01); *H04W 24/02* (2013.01); *H04W 28/048* (2013.01); *H04W 52/241* (2013.01); *H04W 52/242* (2013.01); *H04W 52/243* (2013.01); *H04W 56/001* (2013.01); *H04W 72/042* (2013.01); *H04W 72/0406* (2013.01); *H04W 72/0413* (2013.01); *H04W 72/0446* (2013.01); *H04W 72/0473* (2013.01); *H04W 72/10* (2013.01); *H04W 74/006* (2013.01)

(58) Field of Classification Search
USPC .......................................... 370/329
See application file for complete search history.

(56) References Cited

U.S. PATENT DOCUMENTS

| | | | |
|---|---|---|---|
| 6,711,409 B1 | 3/2004 | Zavgren, Jr. et al. | |
| 7,978,631 B1 | 7/2011 | Abdelaziz et al. | |
| 8,355,736 B2 * | 1/2013 | Mitra .................. | H04W 72/042 370/329 |
| 2006/0045130 A1 * | 3/2006 | Kim .......................... | H04L 1/16 370/469 |
| 2007/0010270 A1 | 1/2007 | Dillon | |
| 2007/0165569 A1 | 7/2007 | Kaminski | |
| 2007/0254643 A1 * | 11/2007 | Garcia .................. | H04L 1/1867 455/423 |
| 2008/0253327 A1 | 10/2008 | Kohvakka et al. | |
| 2009/0034432 A1 | 2/2009 | Bonta et al. | |
| 2010/0075689 A1 | 3/2010 | Uemura et al. | |
| 2010/0093364 A1 | 4/2010 | Ribeiro | |
| 2010/0148940 A1 | 6/2010 | Gelvin et al. | |
| 2010/0291962 A1 | 11/2010 | Kim et al. | |
| 2010/0303034 A1 | 12/2010 | Chen et al. | |
| 2011/0032909 A1 | 2/2011 | Park et al. | |
| 2011/0110275 A1 | 5/2011 | Shaheen | |
| 2011/0151887 A1 | 6/2011 | Hakola | |
| 2011/0319097 A1 | 12/2011 | Wirola | |
| 2012/0021704 A1 | 1/2012 | Chan et al. | |
| 2012/0120892 A1 | 5/2012 | Freda et al. | |
| 2012/0129540 A1 | 5/2012 | Hakola et al. | |
| 2012/0236909 A1 | 9/2012 | Ma et al. | |
| 2013/0138792 A1 | 5/2013 | Preden et al. | |
| 2013/0157670 A1 | 7/2013 | Koskela et al. | |
| 2013/0170468 A1 | 7/2013 | Baker et al. | |
| 2013/0188546 A1 | 7/2013 | Turtinen et al. | |
| 2013/0201891 A1 | 8/2013 | Rodriguez et al. | |
| 2013/0288608 A1 | 10/2013 | Fwu et al. | |
| 2013/0308714 A1 | 11/2013 | Xu et al. | |
| 2013/0308715 A1 | 11/2013 | Nam et al. | |
| 2014/0057670 A1 | 2/2014 | Lim et al. | |
| 2014/0098759 A1 | 4/2014 | Noh et al. | |
| 2014/0098761 A1 | 4/2014 | Lee et al. | |
| 2014/0177683 A1 | 6/2014 | Krishnamurthy et al. | |
| 2014/0328329 A1 | 11/2014 | Novlan et al. | |
| 2014/0376458 A1 | 12/2014 | Ryu et al. | |
| 2015/0016312 A1 | 1/2015 | Li et al. | |
| 2015/0173105 A1 | 6/2015 | Bergstrom et al. | |
| 2015/0223279 A1 | 8/2015 | Jiao et al. | |
| 2015/0257173 A1 | 9/2015 | You et al. | |
| 2015/0296518 A1 | 10/2015 | Yi et al. | |
| 2015/0359004 A1 | 12/2015 | Xu et al. | |
| 2016/0142981 A1 | 5/2016 | Yi et al. | |
| 2016/0150570 A1 | 5/2016 | Wang et al. | |

OTHER PUBLICATIONS

Advisory Action for related U.S. Appl. No. 14/909,082, dated Aug. 10, 2017.
U.S. Office Action issued in U.S. Appl. No. 14/908,858, dated Sep. 15, 2017.
U.S. Office Action issued in U.S. Appl. No. 14/908,974, dated Sep. 6, 2017.
U.S. Office Action issued in U.S. Appl. No. 14/909,082, dated Sep. 15, 2017.
U.S. Office Action issued in corresponding U.S. Appl. No. 14/908,980, dated Aug. 11, 2017.
U.S. Office Action issued in corresponding U.S. Appl. No. 14/909,080, dated Jun. 22, 2017.
U.S. Office Action issued in corresponding U.S. Appl. No. 14/909,082, dated Nov. 10, 2016.
U.S. Office Action dated Jan. 23, 2018 in U.S. Appl. No. 14/908,974.

* cited by examiner

TERMINAL-TO-TERMINAL COMMUNICATION

FIELD

The embodiments discussed herein are related to terminal-to-terminal communication.

BACKGROUND

Terminal-to-terminal communication may allow data transmissions to be made directly between two or more terminals of a telecommunication system. The terminal-to-terminal communication may overlay regular cellular communications, and may be performed with or without cellular network coverage.

In some instances, using terminal-to-terminal communication may increase network capacity. For example, terminal-to-terminal communication may permit spatial multiplexing, which may allow for higher relative spectrum usage. Employing terminal-to-terminal communication may also permit throughput between terminals to be increased if a terminal-to-terminal link experiences better channel quality than a cellular link. Using terminal-to-terminal communication may reduce resource usage when data is transmitted once between two terminals during a terminal-to-terminal transmission, as compared to transmitting the same data twice between the two terminals over a cellular link, i.e., once through an uplink (UL) transmission from a transmitting terminal to a base station and once through a downlink (DL) transmission to a receiving terminal from the base station.

Terminal-to-terminal communication may reduce communication latency of a telecommunication network. For example, terminal-to-terminal communication may not relay data through a base station and/or a core network, thus potentially reducing the transit time of the data and/or the load on the base station and/or the core network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of performing a terminal-to-terminal communication includes performing a terminal-to-terminal transmission via a portion of a radio spectrum licensed for transmission of wireless data. The terminal-to-terminal transmission is transmitted without performing a terminal-to-terminal discovery associated with the terminal-to-terminal transmission. The terminal-to-terminal transmission is configured to be received by a terminal without being routed through a base station. The method further includes checking for an acknowledgement sequence and checking for a negative acknowledgement sequence.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments as herein described may relate to a telecommunication system based on the 3rd Generation Partnership Project's (3GPP) Long Term Evolution (LTE) radio access network. Descriptions involving LTE may also apply to 3GPP's Long Term Evolution Advanced (LTE-A) radio access network. However, the embodiments described herein are not limited to the example telecommunication systems described. Rather, the embodiments described herein may also be applicable to other telecommunication systems.

Embodiments of the present invention will be explained with reference to the accompanying drawings.

Figure 1:
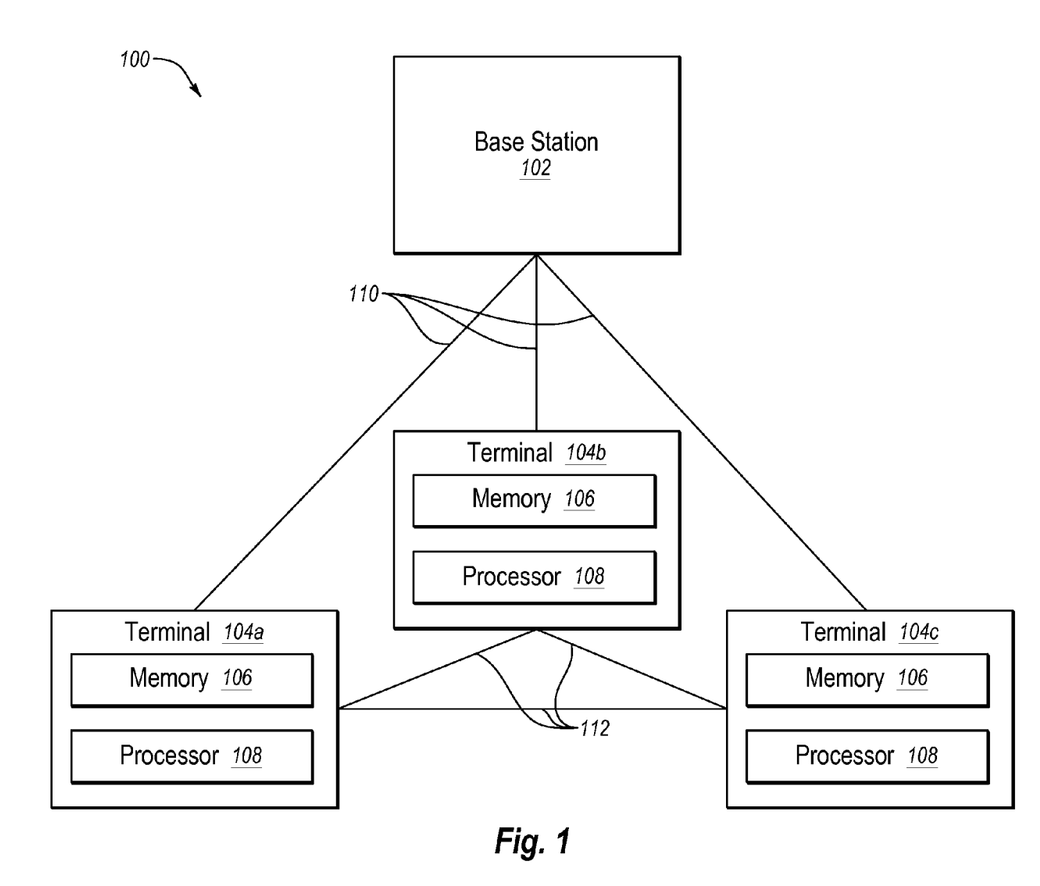
FIG. 1 is a diagrammatic view of an example telecommunication system.

FIG. 1 is a diagrammatic view of an example telecommunication system 100, arranged in accordance with at least one embodiment described herein. In some embodiments, a network architecture of the telecommunication system 100 may include the network architecture of an Evolved Universal Mobile Telecommunications System (E-UMTS). The E-UMTS may include an LTE radio access network, for instance. The radio access network may include an E-UMTS Terrestrial Radio Access Network (E-UTRAN). However, other types of network architecture may alternately or additionally be used.

The telecommunication system 100 may include a base station 102. The base station 102 may include base station equipment, including hardware and/or software for radio communication with radio-communication-equipped nodes ("wireless nodes") which may be described herein as devices. For example, the base station 102 may be equipped for radio communication 110 with devices such as terminal 104a, terminal 104b, and terminal 104c (collectively "terminals 104"). The base station 102 may generally allow the wireless nodes, including the terminals 104, to wirelessly communicate with each other and/or to wirelessly access a network (not shown) via radio communication 110 with the base station 102.

The base station 102 may include hardware and software for radio communication over a licensed spectrum. The licensed spectrum may generally include portions of a radio spectrum licensed for transmission of wireless data, such as cellular data. For example, the base station 102 may be configured to transmit cellular data that complies with an LTE radio access network, such as an LTE radio access network according to 3GPP LTE specification releases 8-12. The base station 102 may include an E-UTRAN NodeB (eNB) associated with LTE radio access networks.

The terminals 104 may include equipment configured to allow the terminals 104 to transmit and receive data via wireless communications via the licensed spectrum. For example, the terminals 104 may include hardware, such as one or more antennas for transmitting and receiving radio transmissions, and codecs. The terminals 104 may include mobile phones, tablet computers, laptop computers, and/or other electronic devices that may use radio communication. Alternately or additionally, the terminals 104 may include devices that employ machine-type communication (MTC). The terminals 104 may include user equipment (UE) associated with LTE radio access networks.

Each of the terminals 104 may include memory 106 and a processor 108. The memory 106 may include a non-transitory computer-readable medium. Instructions such as programming code executable by the processor 108 may be encoded in the memory 106. When the instructions are executed by the processor 108, the associated terminals 104a, 104b, and 104c may perform operations related to and/or including the processes described herein.

The terminals 104 may be equipped for terminal-to-terminal communication 112, which may include device-to-device (D2D) communication associated with LTE radio access networks. The terminal-to-terminal communication 112 may allow the terminals 104 to transmit and/or receive data among the terminals 104 without routing the data through the base station 102. In some instances, the base station 102 may assist the terminal-to-terminal communication 112. For example, the base station 102 may allocate resources and/or coordinate the terminal-to-terminal communication 112. Alternately, the terminals 104 may perform terminal-to-terminal communication 112 without the base station 102.

The terminals 104 may discover each other in preparation for the terminal-to-terminal communication 112 in a process described herein as terminal-to-terminal discovery, which may include D2D discovery associated with LTE radio access networks. Terminal-to-terminal discovery may generally include a process whereby the terminals 104 and/or the base station 102 exchange information about the terminals 104, resources, or the like. In some instances, performing the terminal-to-terminal discovery may allow a terminal-to-terminal control channel to be assigned to the terminals 104. The terminals 104 may use information gathered in the terminal-to-terminal discovery to exchange data via the terminal-to-terminal communication 112.

Terminal-to-terminal communication 112 may include communications described herein as unicasts, group casts, or broadcasts. By way of example, a unicast may occur between a terminal, such as the terminal 104a, and one other terminal within transmission range, such as the terminal 104c.

A group cast may occur between a terminal, such as the terminal 104a, and a subset of all other terminals within a transmission range of the terminal 104a, such as the terminal 104b and the terminal 104c when additional terminals (not shown) are within the transmission range of the terminal 104a.

A broadcast may occur between a terminal, such as the terminal 104a, and all terminals within the transmission range of the terminal 104a, such as the terminal 104b and the terminal 104c when additional terminals (not shown) are not within the transmission range of the terminal 104a.

In some embodiments, the terminal-to-terminal communication 112 may occur prior to and/or without an associated terminal-to-terminal discovery. For example, terminal-to-terminal group casts and/or terminal-to-terminal broadcasts may occur without previously performing terminal-to-terminal discovery. In some instances, the terminal-to-terminal communication 112 may be performed without performing an associated terminal-to-terminal discovery in emergency scenarios, such as policemen and/or firefighters attempting terminal-to-terminal communications during an emergency.

The base station 102 may transmit, to the terminals 104 via the radio communication 110, a resource allocation identifying resources allocated for terminal-to-terminal transmissions without terminal-to-terminal discovery. The terminal-to-terminal transmissions may be part of the terminal-to-terminal communication 112. For example, the base station 102 may identify resources allocated for terminal-to-terminal transmissions without terminal-to-terminal discovery through radio resource control (RRC) and/or through higher layer signaling. In some embodiments, the terminals 104 may be subscribed to a terminal-to-terminal transmission service and may check for the resource allocation identifying resources allocated for terminal-to-terminal transmissions without terminal-to-terminal discovery.

In some embodiments, the resources allocated for terminal-to-terminal transmissions without terminal-to-terminal discovery may be generally allocated and may be for non-exclusive use by the terminals 104 as well as other terminals (not shown). In some instances, resources allocated for terminal-to-terminal transmissions may be exclusively allocated to the terminals 104.

In some embodiments, the resources allocated for terminal-to-terminal transmissions without terminal-to-terminal discovery may include implicitly assigned terminal-to-terminal acknowledgement resources.

Figure 2:
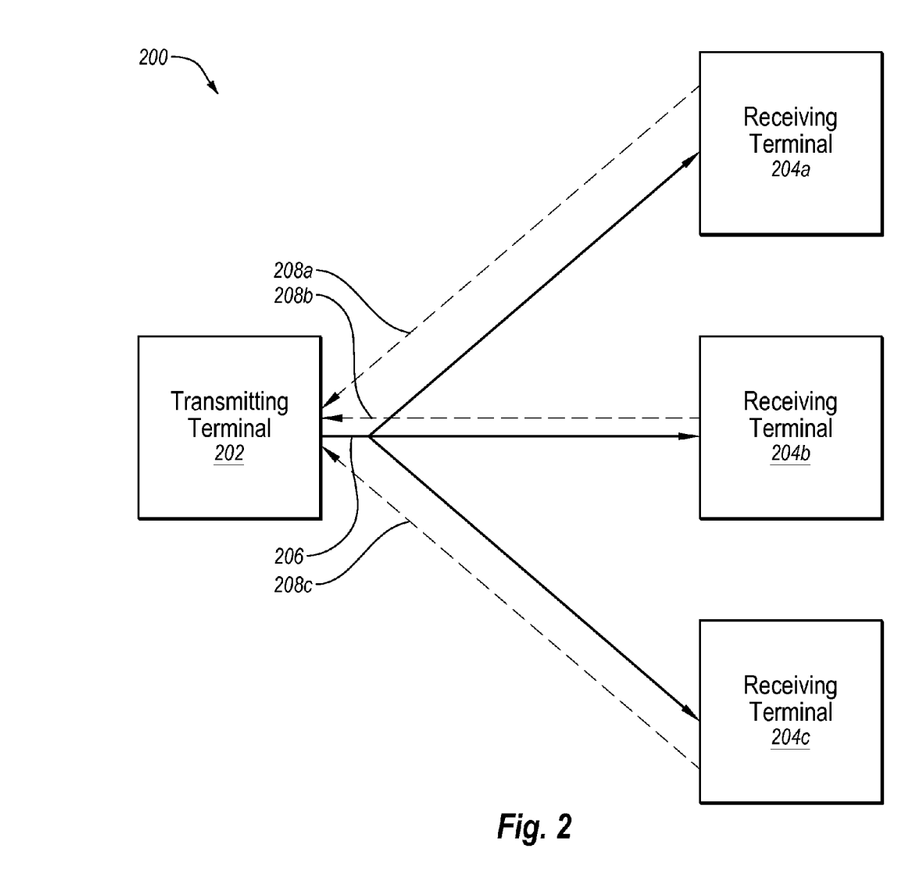
FIG. 2 is a diagrammatic view of an example terminal group.

FIG. 2 is a diagrammatic view of an example terminal group 200, arranged in accordance with at least one embodiment described herein. The terminal group 200 may perform terminal-to-terminal communication without terminal-to-terminal discovery. In some embodiments, the terminal-to-terminal communication may include an acknowledgement mechanism for determining whether a terminal-to-terminal transmission 206 is successfully received and/or decoded.

A transmitting terminal 202 may transmit the terminal-to-terminal transmission 206 without an associated terminal-to-terminal discovery. The transmitting terminal 202 may generally correspond to any of the terminals 104 of FIG. 1. The terminal-to-terminal transmission 206 may be, for example, a group cast or a broadcast.

In some instances, a terminal-to-terminal control channel for the terminal-to-terminal transmission 206 may not be assigned when the resources allocated for the terminal-to-terminal transmission 206 are non-exclusively allocated. The transmitting terminal 202 may not know whether any other terminals are within a transmission range of the terminal-to-terminal transmission 206. Furthermore, if other terminals are within a transmission range of the terminal-to-terminal transmission 206, the transmitting terminal 202 may not know if the terminals are available to receive the terminal-to-terminal transmission 206. By way of example, a terminal may not be available to receive the terminal-to-terminal transmission 206 when the terminal is transmitting or is otherwise not in a receiving mode in a carrier resource subframe of the carrier associated with the terminal-to-terminal transmission 206.

The terminal group 200 may include, by way of example, a receiving terminal 204a, a receiving terminal 204b, and a receiving terminal 204c (collectively "receiving terminals 204") within the transmission range of the terminal-to-terminal transmission 206. The receiving terminals 204 may generally correspond to the terminals 104 of FIG. 1. The receiving terminals 204 may receive the terminal-to-terminal transmission 206 when the terminal-to-terminal transmission 206 is a broadcast or the terminal-to-terminal transmission 206 is a group cast and the receiving terminals 204 are associated with the group associated with the group cast.

A series of packets relating to a terminal-to-terminal communication and transmitted by the transmitting terminal 202 may be described as a communication session. For example, a series of group cast or broadcast terminal-to-terminal transmissions 206 transmitted by the transmitting terminal 202 related to a voice over internet protocol (VoIP) communication, a video communication, a data communication, or the like may be described as a communication session.

In some embodiments, the terminal-to-terminal transmission 206 may include a session number associated with the communication session. The session number may be unique to an area to reduce the chance that packets from two different sessions with the same session number are transmitted to the same receiving terminals 204. In some embodiments, the session number may be configured via the RRC.

In some instances, the session number may be assigned in advance. For example, a base station such as the base station 102 of FIG. 1 may assign the transmitting terminal 202 a session number. Alternately or additionally, the transmitting terminal 202 may select a session number from a range of session numbers. For example, a base station such as the base station 102 of FIG. 1 may assign the transmitting terminal 202 a range of session numbers from which the transmitting terminal 202 may select a particular session number.

The session number may be included in the terminal-to-terminal transmission 206. In some embodiments, the session number may be included in a header of the terminal-to-terminal transmission 206. The header of the terminal-to-terminal transmission 206 may further include information identifying a modulation and coding scheme (MCS), resources of the communication session and/or terminal-to-terminal transmission 206, or the like or any combination thereof. A terminal-to-terminal paging control channel (PCCH) signaling format used for the header of the terminal-to-terminal transmission 206 may be defined in advance and may generally be known to the transmitting terminal 202 and the receiving terminals 204.

A payload of the terminal-to-terminal transmission 206 may include the data being transmitted. In some instances, the header and/or the payload of the terminal-to-terminal transmission 206 may be multiplexed in the time domain.

Upon receiving the terminal-to-terminal transmission 206, the receiving terminals 204 may transmit a response. For example, the receiving terminal 204a may transmit a response 208a, the receiving terminal 204b may transmit a response 208b, and the receiving terminal 204c may transmit a response 208c (the response 208a, the response 208b, and the response 208c may be referenced herein collectively as "responses 208"). The responses 208 may include one or more acknowledgement (ACK) sequences and/or one or more negative acknowledgement (NACK) sequences.

The responses 208 may be transmitted via terminal-to-terminal acknowledgement resources, which may be implicitly allocated with resources allocated for terminal-to-terminal transmissions without terminal-to-terminal discovery. The transmitting terminal 202 may monitor the terminal-to-terminal acknowledgement resources for the ACK sequences and the NACK sequences.

The receiving terminals 204 that receive and successfully decode the terminal-to-terminal transmission 206 may transmit responses 208 including ACK sequences. In some embodiments, if the terminal-to-terminal transmission 206 includes a session number, the ACK sequence may include and/or may be based on the session number. For example, the receiving terminals 204 may use the session number to derive a pseudo-random session-specific ACK sequence. The ACK sequence may be a code-division multiple access (CDMA) sequence.

The receiving terminals 204 that receive the terminal-to-terminal transmission 206 but fail to successfully decode the terminal-to-terminal transmission 206 may transmit responses 208 including NACK sequences. For example, the receiving terminals 204 may receive packets that the receiving terminals 204 may not decode due to a poor signal-to-interference-and-noise ratio (SINR).

The NACK sequences may be non-session specific. For example, the NACK sequences may include a NACK sequence common to all group cast or broadcast communication sessions. The NACK sequence may be a CDMA sequence.

The transmitting terminal 202 may check for ACK sequences and for NACK sequences. The ACK sequences and the NACK sequences may inform the transmitting terminal 202 whether there are receiving terminals 204 within the transmission range of the terminal-to-terminal transmission 206.

In some instances, no receiving terminals 204 available to receive the terminal-to-terminal transmission 206 may be in the transmission range of the terminal-to-terminal transmission 206. Without checking for ACK sequences and/or NACK sequences, the transmitting terminal 202 may not be able to determine that the terminal-to-terminal transmission 206 has been transmitted in vain. If the transmitting terminal 202 may not determine that the terminal-to-terminal transmission 206 has been transmitted in vain, the transmitting terminal 202 may continue transmitting terminal-to-terminal transmissions 206 that go unreceived and the transmitting terminal 202 may waste energy resources, such as battery power stores.

Where the transmitting terminal 202 checks for ACK sequences and/or NACK sequences, the transmitting terminal 202 may base future terminal-to-terminal transmissions (not shown) on whether ACK sequences and/or NACK sequences are received. In some embodiments, a matched filter-type detector may be used to detect the ACK sequences and/or the NACK sequences. The transmitting terminal 202 may detect both ACK sequences and NACK sequences. In some instances, the transmitting terminal 202 may not be able to detect the number of ACK sequences and/or NACK sequences present. For example, the transmitting terminal 202 may determine when at least one ACK sequence is present and when at least one NACK sequence is present.

In some embodiments, the transmitting terminal 202 may experience one of four outcomes in detecting ACK sequences and NACK sequences following transmission of the terminal-to-terminal transmission 206, as set forth in the following table. Other outcomes may alternately or additionally be possible.

| Outcome | ACK Sequence Detected? | NACK Sequence Detected? |
| --- | --- | --- |
| 1 | No | No |
| 2 | No | Yes |
| 3 | Yes | No |
| 4 | Yes | Yes |

Outcome 1 may represent the transmitting terminal 202 failing to receive the ACK sequence and failing to receive the NACK sequence in response to the terminal-to-terminal transmission 206. For example, no terminals may have been in the transmission range of the terminal-to-terminal transmission 206 or may have been otherwise unavailable to receive the terminal-to-terminal transmission 206. When experiencing outcome 1, the transmitting terminal 202 may cancel future terminal-to-terminal transmissions (not shown) generally corresponding to the terminal-to-terminal transmission 206. In some instances, the transmitting terminal 202 may resume the future terminal-to-terminal transmissions after a delay. In some embodiments, the transmitting terminal 202 may transmit the future terminal-to-terminal transmissions with an increased transmission power to increase the transmission range.

Canceling the future terminal-to-terminal transmissions in response to failing to receive the ACK sequence and failing to receive the NACK sequence may save energy resources, such as battery power stores, that would otherwise be wasted by sending terminal-to-terminal transmissions 206 that are unlikely to be received. In some embodiments, the transmitting terminal 202 may decide to cancel the future terminal-to-terminal transmissions after outcome 1 has been observed in response to multiple terminal-to-terminal transmissions generally corresponding to the terminal-to-terminal transmission 206.

Outcome 2 may represent the transmitting terminal 202 both failing to receive the ACK sequence and detecting the NACK sequence in response to the terminal-to-terminal transmission 206. For example, one or more of the receiving terminals 204 may receive the terminal-to-terminal transmission 206, but may not be able to decode the terminal-to-terminal transmission 206, possibly due to a poor SINR resulting from poor signal strength or interference from other transmissions (not shown), or the like.

In response to outcome 2, the transmitting terminal 202 may transmit one or more of the future terminal-to-terminal transmissions with changed transmission parameters different from initial transmission parameters of the terminal-to-terminal transmission 206. For example, the transmitting terminal 202 may transmit the future terminal-to-terminal transmissions with increased transmission power, on different transmission resources, or the like or any combination thereof. In some embodiments, the transmitting terminal 202 may decide to change the parameters of the future terminal-to-terminal transmissions after outcome 2 has been observed in response to multiple terminal-to-terminal transmissions generally corresponding to the terminal-to-terminal transmission 206.

Outcome 3 may represent the transmitting terminal 202 detecting the ACK sequence and failing to receive the NACK sequence in response to the terminal-to-terminal transmission 206. For example, the terminal-to-terminal transmission 206 may be received and decoded successfully by one or more of the receiving terminals 204. In response to outcome 3, the transmitting terminal 202 may transmit future terminal-to-terminal transmissions with the same initial transmission parameters as the terminal-to-terminal transmission 206.

Outcome 4 may represent the transmitting terminal 202 detecting the ACK sequence and detecting the NACK sequence in response to the terminal-to-terminal transmission 206. For example, the terminal-to-terminal transmission 206 may be received and successfully decoded by at least one of the receiving terminals 204, and received and not successfully decoded by at least one other of the receiving terminals 204.

In response to outcome 4, the transmitting terminal 202 may transmit the future terminal-to-terminal transmissions with the same parameters as the terminal-to-terminal transmission 206, similar to or the same as the response of the transmitting terminal 202 to outcome 3. Alternately, the transmitting terminal 202 may transmit the future terminal-to-terminal transmissions with changed transmission parameters, similar to or the same as the response of the transmitting terminal 202 to outcome 2.

In some embodiments, the transmitting terminal 202 may decide to transmit the future terminal-to-terminal transmissions with the initial transmission parameters or with changed transmission parameters after outcome 4 has been observed in response to multiple terminal-to-terminal transmissions generally corresponding to the terminal-to-terminal transmission 206. In instances where the transmitting terminal 202 may detect or estimate a relative number of the ACK sequences and/or a relative number of the NACK sequences received in response to the terminal-to-terminal transmission 206, the future terminal-to-terminal transmissions may be transmitted with the initial transmission parameters or changed transmission parameters based at least in part on the relative number of the ACK sequences and/or the relative number of the NACK sequences received in response to the terminal-to-terminal transmission 206 or in response to multiple terminal-to-terminal transmissions 206.

Figure 3:
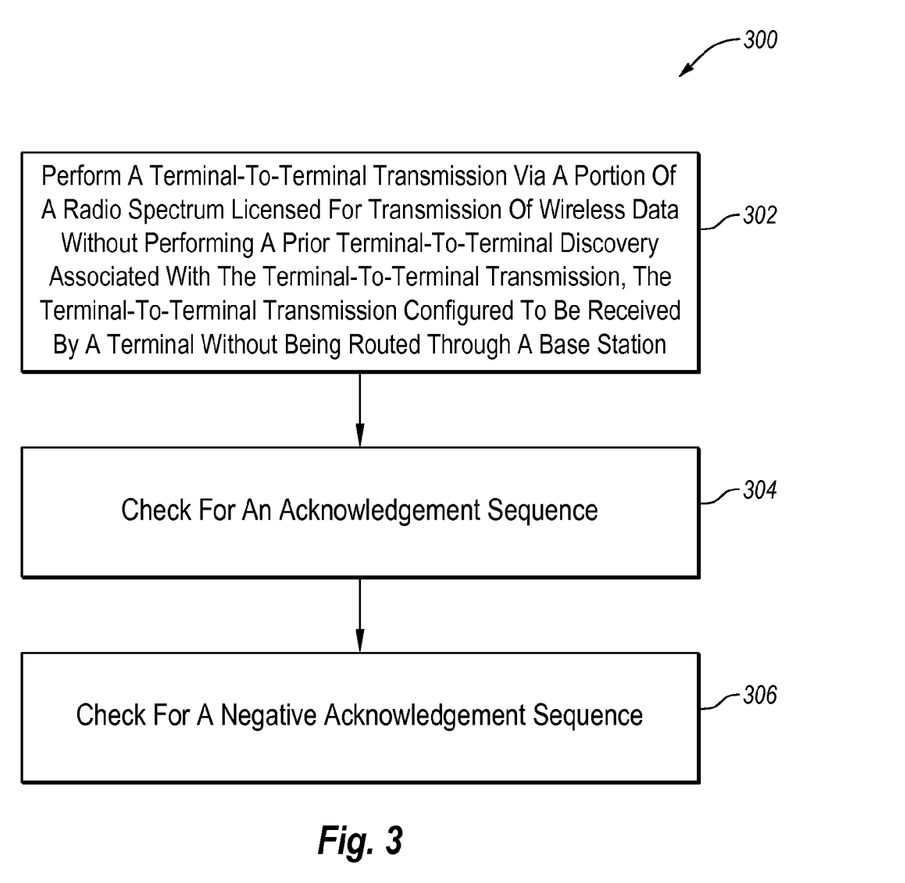
FIG. 3 is a flowchart of an example method of performing a terminal-to-terminal communication without prior terminal-to-terminal discovery.

FIG. 3 is a flowchart of an example method 300 of performing a terminal-to-terminal communication without prior terminal-to-terminal discovery. The method 300 may be performed by a terminal such as the transmitting terminal 202 of FIG. 2 and/or any of the terminals 104 of FIG. 1.

The method 300 may begin at block 302, where a terminal-to-terminal transmission may be transmitted without performing an associated terminal-to-terminal discovery. The terminal-to-terminal transmission may generally correspond to the terminal-to-terminal transmission 206 of FIG. 2. The terminal-to-terminal transmission may be transmitted with initial transmission parameters. In some embodiments, the terminal-to-terminal transmission may include a session number.

The method 300 may continue at block 304, where the method 300 may include checking for an acknowledgement sequence. In some embodiments, the terminal-to-terminal transmission and the acknowledgement sequence may include a session number.

The method 300 may continue at block 306, where the method 300 may include checking for a negative acknowledgement sequence.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, in some embodiments, the method 300 may further include receiving a resource allocation identifying resources allocated for terminal-to-terminal transmissions without terminal-to-terminal discovery. In these and other embodiments, transmitting the terminal-to-terminal transmission may occur via at least one of the resources allocated for terminal-to-terminal transmissions without prior terminal-to-terminal discovery. The resources allocated for terminal-to-terminal transmissions without terminal-to-terminal discovery may include implicitly allocated terminal-to-terminal acknowledgement resources. Checking for the acknowledgement sequence and checking for the negative acknowledgement sequence may include monitoring at least one of the terminal-to-terminal acknowledgement resources.

In some embodiments, the method 300 may further include failing to receive the acknowledgement sequence, failing to receive the negative acknowledgement sequence, and canceling a future terminal-to-terminal transmission.

Alternately or additionally, the method 300 may include receiving the acknowledgement sequence and transmitting a second terminal-to-terminal transmission without performing terminal-to-terminal discovery. The second terminal-to-terminal transmission may be transmitted with the initial transmission parameters of the terminal-to-terminal transmission of block 302.

Alternately or additionally, the method may include receiving the negative acknowledgement sequence and transmitting a second terminal-to-terminal transmission without performing terminal-to-terminal discovery. The second terminal-to-terminal transmission may be transmitted with changed transmission parameters different from the initial transmission parameters of the terminal-to-terminal transmission of block 302.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of performing a terminal-to-terminal communication, the method comprising:
    receiving, at a first terminal, a resource allocation identifying resources allocated for terminal-to-terminal transmissions without prior terminal-to-terminal discovery;
    performing, at the first terminal, a terminal-to-terminal transmission via the resources allocated for terminal-to-terminal transmissions without prior terminal-to-terminal discovery, the terminal-to-terminal transmission configured to be received directly from the first terminal by a receiving terminal;
    checking, at the first terminal, for an acknowledgement sequence; and
    checking, at the first terminal, for a negative acknowledgement sequence.

2. The method of claim 1, wherein the terminal-to-terminal transmission includes a session number and the acknowledgement sequence includes the session number.

3. The method of claim 1, wherein transmitting the terminal-to-terminal transmission occurs via at least one of the resources allocated for terminal-to-terminal transmissions without prior terminal-to-terminal discovery.

4. The method of claim 1, wherein the resources allocated for terminal-to-terminal transmission without prior terminal-to-terminal discovery include terminal-to-terminal acknowledgement resources implicitly allocated with the resources allocated for terminal-to-terminal transmissions without prior terminal-to-terminal discovery.

5. The method of claim 4, wherein checking for the acknowledgement sequence and checking for the negative acknowledgement sequence includes monitoring at least one of the terminal-to-terminal acknowledgement resources.

6. The method of claim 1, further comprising:
    failing to receive the acknowledgement sequence;
    failing to receive the negative acknowledgement sequence; and
    canceling a future terminal-to-terminal transmission.

7. The method of claim 1, further comprising:
    receiving the acknowledgement sequence; and
    transmitting a second terminal-to-terminal transmission without performing terminal-to-terminal discovery, the second terminal-to-terminal transmission transmitted with initial transmission parameters,
    wherein the terminal-to-terminal transmission is transmitted with the initial transmission parameters.

8. The method of claim 1, further comprising:
    receiving the negative acknowledgement sequence; and transmitting a second terminal-to-terminal transmission without performing terminal-to-terminal discovery, the second terminal-to-terminal transmission transmitted with changed transmission parameters, wherein the terminal-to-terminal transmission is transmitted with initial transmission parameters different from the changed transmission parameters.

9. A terminal including a non-transitory computer-readable medium having encoded therein programming code executable by a processor to perform operations comprising:
receiving a resource allocation identifying resources allocated for terminal-to-terminal transmissions without prior terminal-to-terminal discovery;
performing a terminal-to-terminal transmission via the resources allocated for terminal-to-terminal transmissions without prior terminal-to-terminal discovery, the terminal-to-terminal transmission configured to be received directly from the terminal by another terminal;
checking for an acknowledgement sequence; and
checking for a negative acknowledgement sequence.

10. The terminal of claim 9, wherein the terminal-to-terminal transmission includes a session number and the acknowledgement sequence includes the session number.

11. The terminal of claim 9, wherein transmitting the terminal-to-terminal transmission occurs via at least one of the resources allocated for terminal-to-terminal transmissions without prior terminal-to-terminal discovery.

12. The terminal of claim 9, wherein the resources allocated for terminal-to-terminal transmission without prior terminal-to-terminal discovery include terminal-to-terminal acknowledgement resources implicitly allocated with the resources allocated for terminal-to-terminal transmissions without prior terminal-to-terminal discovery.

13. The terminal of claim 12, wherein checking for the acknowledgement sequence and checking for the negative acknowledgement sequence includes monitoring at least one of the terminal-to-terminal acknowledgement resources.

14. The terminal of claim 9, the operations further comprising:
failing to receive the acknowledgement sequence;
failing to receive the negative acknowledgement sequence; and
canceling a future terminal-to-terminal transmission.

15. The terminal of claim 9, the operations further comprising:
receiving the acknowledgement sequence; and
transmitting a second terminal-to-terminal transmission without performing terminal-to-terminal discovery, the second terminal-to-terminal transmission transmitted with initial transmission parameters,
wherein the terminal-to-terminal transmission is transmitted with the initial transmission parameters.

16. The terminal of claim 9, the operations further comprising:
receiving the negative acknowledgement sequence; and
transmitting a second terminal-to-terminal transmission without performing terminal-to-terminal discovery, the second terminal-to-terminal transmission transmitted with changed transmission parameters,
wherein the terminal-to-terminal transmission is transmitted with initial transmission parameters different from the changed transmission parameters.

17. A method of performing terminal-to-terminal communication without terminal-to-terminal discovery, the method comprising:
receiving, at a first terminal, a resource allocation identifying resources of a radio spectrum licensed for transmission of wireless data, the resources allocated for terminal-to-terminal transmissions without prior terminal-to-terminal discovery, the resources allocated for terminal-to-terminal transmissions including implicitly allocated terminal-to-terminal acknowledgement resources;
performing, at the first terminal, a plurality of terminal-to-terminal transmissions via the resources allocated for terminal-to-terminal transmissions without prior terminal-to-terminal discovery, the plurality of terminal-to-terminal transmissions configured to be received directly from the first terminal by a receiving terminal; and
monitoring the terminal-to-terminal acknowledgment resources, including checking, at the first terminal, for both an acknowledgement sequence and a negative acknowledgement sequence after transmitting each terminal-to-terminal transmission of the plurality of terminal-to-terminal transmissions.

18. The method of claim 17, further comprising:
failing to receive the acknowledgement sequence after each of the plurality of terminal-to-terminal transmissions;
failing to receive the negative acknowledgement sequence after each of the plurality of terminal-to-terminal transmissions; and
canceling a future terminal-to-terminal transmission.

* * * * *